(12) United States Patent
Hammarth et al.

(10) Patent No.: US 6,585,411 B2
(45) Date of Patent: Jul. 1, 2003

(54) AEROSOL DISPENSER TEMPERATURE INDICATOR

(75) Inventors: Mark Christopher Hammarth, Coram, NY (US); William Henry Passarotti, Bridgewater, NJ (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/682,963

(22) Filed: Nov. 2, 2001

(65) Prior Publication Data

US 2003/0086474 A1 May 8, 2003

(51) Int. Cl.[7] .............................................. G01K 11/12
(52) U.S. Cl. ....................................... 374/150; 374/162
(58) Field of Search ................................... 374/150, 162

(56) References Cited

U.S. PATENT DOCUMENTS

| | | | | |
|---|---|---|---|---|
| 3,696,675 A | * | 10/1972 | Gilmour | 116/201 |
| 3,704,625 A | * | 12/1972 | Seto et al. | 349/199 |
| 4,538,926 A | * | 9/1985 | Chretien | 374/150 |
| 4,758,708 A | * | 7/1988 | Manchester | 219/432 |
| 4,863,282 A | * | 9/1989 | Rickson | 250/372 |
| 5,211,317 A | * | 5/1993 | Diamond et al. | 220/666 |
| 5,218,834 A | * | 6/1993 | Major et al. | 374/143 |
| 5,634,426 A | * | 6/1997 | Tomlinson et al. | 116/207 |
| 5,738,442 A | * | 4/1998 | Paron et al. | 374/150 |
| 5,992,707 A | * | 11/1999 | Gaichuk | 222/402.13 |
| 6,012,411 A | * | 1/2000 | Hochbrueckner | 116/200 |
| 6,126,313 A | * | 10/2000 | Schiller | 374/142 |
| 6,324,963 B1 | * | 12/2001 | Cirasole | 99/285 |
| 6,415,957 B1 | * | 7/2002 | Michaels et al. | 219/214 |

* cited by examiner

Primary Examiner—Diego Gutierrez
Assistant Examiner—Lydia M. De Jesús
(74) Attorney, Agent, or Firm—John H. Pilarski; Mark W. Croll

(57) ABSTRACT

A liquid crystal temperature indicator, and aerosol dispensers equipped with a properly placed indicator, to facilitate using aerosols within preferred temperature ranges or at optimum temperatures. The temperature indicator uses different colors to graphically illustrate temperatures and/or temperature ranges, as well as temperatures above and below optimal temperatures or preferred temperature ranges. Temperature indicators are reusable; they may be self-adhesive and may optionally be transferred from one dispenser to another.

20 Claims, 1 Drawing Sheet

AEROSOL DISPENSER TEMPERATURE INDICATOR

BACKGROUND OF THE INVENTION

Aerosol dispensers yield optimum performance when used within preferred operating temperature ranges. Performance problems associated with lower-than-preferred operating temperatures include sputtering, decreased uniformity and/or range of spray, shorter open times, and degraded operational properties of aerosolized materials such as adhesives. On the other hand, storage, transportation and/or use of aerosol dispensers at higher-than-preferred temperatures may result in excessive internal pressure leading to rupture of the dispenser, as well as causing excessive overspray and/or chemical degradation of the material to be aerosolized. Preferred temperature ranges thus depend in part on characteristics of the material to be aerosolized and any propellant present to pressurize the liquid in an aerosol dispenser. Such characteristics include viscosity, chemical stability, vapor pressure, specific heat and surface tension.

Notwithstanding the sensitivity of aerosol dispensers' performance and safety to operating temperature, many such devices are used with little or no reference to such temperature. For example, the operating temperature of an aerosol dispenser may or may not be closely related to ambient temperature. Temperatures achieved after equilibration of an aerosol dispenser for significant periods in relatively hot or cold locations may not be changed quickly on movement to an area of different ambient temperature. Further, in a dispenser that is partially-filled with liquid, the space above the liquid will usually equilibrate more rapidly than the liquid itself. Heat from the hand of a user may raise the temperature of the upper portion of a dispenser significantly while the temperature of liquid in the lower portion of the dispenser may have changed very little. Users who rely on the "feel" of an aerosol dispenser may thus be deceived as to whether the dispenser (particularly the liquid to be aerosolized) has reached an acceptable operating temperature.

Other temperature-related problems with aerosol dispensers can occur when the dispenser is unwittingly placed on a heat sink (e.g., a concrete floor or a large piece of metal) which may result in relatively rapid changes in the temperature of liquid in the dispenser. And still other problems stem from the fact that expansion of the propellant gas within the dispenser during use is a cooling process. While cooling may occur relatively quickly in the gaseous space above the pressurized liquid during use, the liquid itself will usually cool more slowly. So again, users who rely on the "feel" of an aerosol dispenser may believe that the liquid to be aerosolized has reached an unacceptably low operating temperature substantially before it actually has. Conversely, an aerosol dispenser in heavy use may be cooled sufficiently by gas expansion to require repeated adjustments of measured temperature by adding heat to the dispenser periodically during such use. The possibility of user miscues in these situations could be reduced or eliminated if reliable and timely estimates of the liquid temperature in an aerosol dispenser could be inexpensively made. But conventional bulb thermometers are relatively fragile and not readily adaptable for use with aerosol dispensers. And infrared thermometers, in addition to being fragile, are too expensive for routine use with the wide variety of aerosol dispensers in common use.

SUMMARY OF INVENTION

The present invention relates to methods and apparatus for making better aerosols by effectively addressing the temperature-related problems noted above. One begins with a container having inner and outer surfaces, adding liquid to the container and pressurizing the liquid. Using the present invention, one estimates the liquid temperature by measuring the container outer surface temperature in an area directly or nearly directly opposite a portion of the container inner surface that contacts the pressurized liquid. By comparing the measured surface temperature with a predetermined (preferred) temperature range and then controlling heat flow to the container to adjust the measured temperature to within the predetermined range, the pressurized liquid is prepared for release from the container through a nozzle as an aerosol. Note that the controlled heat flow may be positive (i.e., heat transfer into the container and liquid from a heat source such as hot water for raising their temperatures), negative (i.e., heat transfer out of the container and liquid to a heat sink such as cold water for lowering their temperatures), or zero (i.e., when the container and liquid temperatures are within the predetermined range and no heat transfer is required).

In preferred embodiments of the present invention, a liquid crystal temperature indicator is either permanently or reversibly adhered to the outer surface of an aerosol dispenser in a location that will allow estimation of the temperature of the liquid inside the dispenser. Liquid crystals are composed of elongated organic molecules that can exhibit different physical properties (e.g., optical and electrical properties) at different temperatures. Using, for example, changes in the color of a plurality of liquid crystals at different temperatures arranged in numerical (i.e., ascending or descending) order, temperature indicators of the present invention can be coupled to aerosol dispensers to indicate desired temperature adjustments to a dispenser within a range of temperatures. The temperature indicators thus act as guides for the use of appropriate heat flow control methods for achieving preferred temperature conditions for making and using aerosol. United States Patents related to temperature measurement using liquid crystals include Nos.: U.S. Pat. No. 4,064,872 (Capon), issued Dec. 27, 1977; U.S. Pat. No. 6,257,759 (Winston, et al), issued Jul. 10, 2001; U.S. Pat. No. 6,294,109 (Raton, et al); and U.S. Pat. No. 6,284,078 (Witonsky, et al), issued Sep. 4, 2001, each said patent incorporated herein by reference.

Because liquid tends to collect in the lower portion of a dispenser intended to be stored and/or operated vertically, a temperature indicator will preferably be adhered to the external surface of the dispenser bottom, or to an adjacent portion of the external surface of the dispenser wall lying between and spacing apart the top and bottom of the dispenser. Since hand-held dispensers of this general design are often for single or short-term use in light duty applications, preferred embodiments of the temperature indicators for such dispensers may incorporate a non-permanent self-adhesive backing allowing the indicator to be peeled off one dispenser and applied to another.

In commonly-available hand-held aerosol dispensers (e.g., those used for small quantities of spray paint or insect repellant), the dispenser is usually operated and stored in a vertical position, so that any liquid present in the dispenser collects in the bottom portion. A finger-operated valve actuator and nozzle assembly is sealed in the top of the dispenser. The valve actuator and nozzle assembly, in turn, is sealingly coupled to an internal valve that controls flow to the nozzle from a liquid feed tube extending from the dispenser top into the liquid to be aerosolized. To allow use of virtually all of the liquid in a dispenser, the liquid feed tube usually extends to or nearly to the bottom of the dispenser, with one or more ports for liquid entry to the feed tube, all such ports remaining under the liquid surface during all operational conditions when the dispenser is held substantially vertically.

On the other hand, special-purpose aerosol dispensers may have sizes, shapes and service lifetimes very different from the hand-held dispensers described above. For example, certain commercial models may weigh up to 18 kilograms. And some aerosol dispensers may comprise a canister adapted for repeated refilling with liquid to be aerosolized. Where repeated and/or extended use of a dispenser is anticipated, more robust methods of adhering the temperature indicators of the present invention to the dispenser surface are preferred. These methods may include, but are not limited to, permanent adhesives, mechanical clamps, and elastic bands. Further, transparent protective coatings and/or films may be applied over temperature indicators to reduce damage due to rough handling while still allowing visual access to the indicator.

Regardless of where and how they are placed on an aerosol dispenser, temperature indicators of the present invention are adhered to the dispenser surface on which they are placed so as to reliably reflect the temperature of that surface accurately, preferably within about 1.11 degrees Celsius (C.). In certain applications where, for example, a rough or uneven dispenser surface might impede accurate surface temperature measurement by a liquid crystal temperature indicator of the present invention, a heat-conducting medium such as a gel may be applied between the indicator and the surface to improve adhesion between surface and indicator.

Additionally, certain aerosol dispensers may have shapes that allow or even mandate placement of a plurality of liquid crystal temperature indicator(s) at various locations on the dispenser outer surface instead of the placement on or adjacent to the bottom as described above. For example, where convection currents in the liquid to be aerosolized are impeded by dispenser geometry and/or properties of the liquid (e.g., high viscosity), a plurality of temperature indicators may be needed to indicate significant temperature gradients in the liquid. If present, such temperature gradients may indicate the need for additional thermal equilibration time and/or control of heat flow to the dispenser and liquid. In each such instance, temperature indicators will preferably be placed to indicate surface temperature of an exterior portion of the aerosol dispenser that is directly or nearly directly opposite a portion of the dispenser interior wall contacting the liquid to be aerosolized.

DETAILED DESCRIPTION

Figure 1:
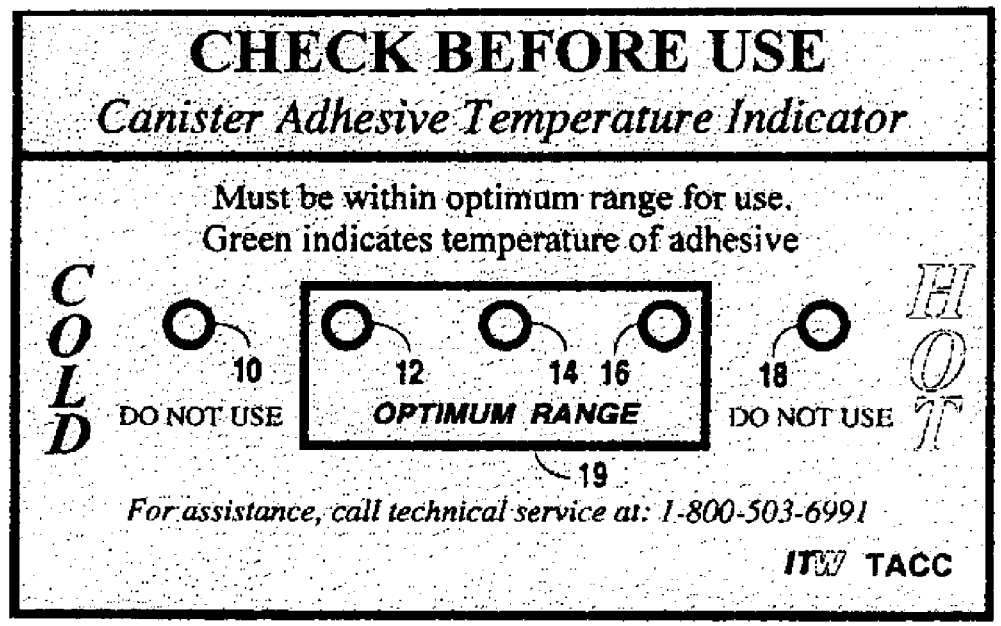
FIG. 1 schematically illustrates a prototype self-adhesive liquid crystal temperature indicator.

A preferred embodiment of the temperature indicator 20 of the present invention, as schematically illustrated in FIG. 1, is based on liquid crystal technology that allows temperatures to be indicated by the color of one or more liquid crystals. Such a color temperature relationship for a given liquid crystal is entirely reversible and repeatable, allowing the indicator 20 to be reused indefinitely. In certain preferred embodiments, the indicator 20 consists of a plurality of different liquid crystals, each of which appears green at a different, predetermined and highly repeatable rated temperature (e.g., liquid crystal 14 in FIG. 1 appears green at a temperature of 23.89 degrees C.). In addition to appearing green at a predetermined rated temperature, moreover, each of the plurality of liquid crystals appears blue at a temperature 5.56 degrees C. below its rated temperature, and appears brown at a temperature 5.56 degrees C. above its rated temperature. An indicator 20 suitable for adhesion to an aerosol dispenser 40 (see FIG. 2) for a laminate adhesive that is applied as an aerosol may thus comprise, for example, a set of five different liquid crystals (10, 1 2, 14, 16 and 18 in FIG. 1) having rated temperatures of 12.78, 18.33, 23.89, 29.44, and 35 degrees C. respectively. A different type of adhesive or an entirely different chemical might require a different set of liquid crystals in a temperature indicator because, for example, their best application or performance properties may occur in a different temperature range. Other materials may also be more sensitive to temperature, necessitating a finer resolution and/or narrower preferred temperature range than that provided by the ten-degree steps in the above example. Liquid crystals meeting these requirements may be ordered from Tempil, Inc. (2901 Hamilton Boulevard, South Plainfield, N.J. 07080).

Figure 2:
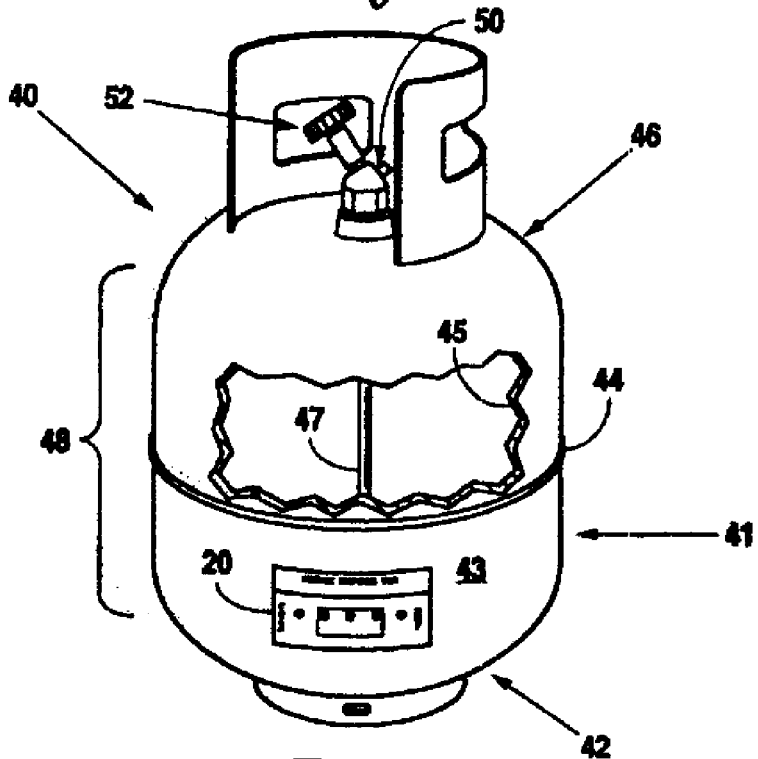
FIG. 2 schematically illustrates an aerosol dispenser showing preferred placement of self-adhesive liquid crystal temperature indicators and a cutaway portion revealing the dispenser interior, including a liquid feed tube.

Continuing with the laminate adhesive aerosol dispenser 40 example above, the indicator 20 with the five described liquid crystals may be adhered to the dispenser 40 as shown in FIG. 2, with the liquid crystals 10, 12,14, 16 and 18 arranged in an ordered linear array of circular viewing areas as schematically illustrated in FIG. 1. In this example, the liquid crystal 10 having the lowest rated temperature (12.78 degrees C.) is visible in the left-most circle, while the liquid crystal 18 having the highest rated temperature (35 degrees C.) is visible in the right-most circle. Liquid crystals 12, 14 and 16 with the 18.33, 23.89 and 29.44 degree ratings respectively are grouped in the middle of the array within a printed border 19 and labeled with the legend OPTIMUM RANGE. The liquid crystals having the highest and lowest temperature ratings, on the other hand, are at opposite ends of the array (labeled HOT and COLD respectively), and both of their respective circular liquid crystal viewing areas are labeled DO NOT USE. This means that if any of the three liquid crystals 12, 14 and 16 rated at 18.33, 23.89 or 29.44 degrees respectively appear green after suitable time for temperature equilibration in the dispenser 40, then the laminate adhesive can be properly aerosolized. If, on the other hand, all of the liquid crystals appear black, a user will know that the temperature is either greater than 40.56 degrees C. (indicating a need for cooling the dispenser) or less than 7.22 degrees C. (indicating a need for heating the dispenser). As a practical matter, since the need for heating or cooling would thus be palpably clear to a user, the user then need only apply heat transfer in the appropriate direction to the dispenser 40 while observing the three center liquid crystals 12, 14 and 16 for an appearance of green. Because of the relatively long time constants encountered in heating and cooling large dispensers, the 12.78 and 35 degree rating liquid crystals may be used to provide a warning to avoid over-correction by slowing the rate of heating or cooling of the dispenser as the desired temperature is approached.

Note that there is no requirement for uniform spacing of the liquid crystal rated temperatures as used in the above example. In other applications, for example, the liquid crystals used to indicate a DO NOT USE condition (i.e., dispenser temperature either too high or too low) might have rated temperatures spaced differently from the rated temperature spacing of the OPTIMUM RANGE group of liquid crystals. Note also that although a plurality of liquid crystals having substantially equally-spaced rated temperatures is desirable to indicate the OPTIMUM RANGE in many preferred embodiments, the minimum number required is a single liquid crystal having a rated temperature substantially centered within a predetermined acceptable range for the given application. The latter case, which may be encountered in well-controlled industrial environments, could simply provide a GO or NO GO indication by the presence or absence of green in a single liquid crystal. But by using the full color range of a single crystal, a preferred temperature range may be indicated, the lower range being indicated by the color blue, the mid-range being indicated by the color green (at the crystal's rated temperature), and the high range being indicated by the color brown. Whether a single optimum temperature or a preferred temperature range is indicated depends on a predetermined standard which describes a general property of the temperature indicator (such as color) as a function of temperature.

In preferred embodiments, the predetermined standard relates one or more specific temperatures to one or more corresponding measures of the general property (e.g., green corresponds to 23.89 degrees C.). The predetermined standard may comprise, for example, printed color-identification instructions (i.e., printed words describing one or more colors to be observed, such as blue, green, brown), or a printed color chart graphically illustrating the subject colors, or both printed words and colors. Further, the predetermined standard may be incorporated in a liquid crystal temperature indicator (as in a self-adhesive temperature indicator label) or may be provided separately. More flexible liquid crystal temperature indicators, as in the above adhesive aerosol example, are suitable for field conditions in which aerosol dispensers may be stored and used within a wide range of ambient temperatures.

User complaints of premature failures of laminate adhesive in such field conditions were part of the reason for a recent investigation into possible causes for the failures. Complaints were observed to rise in the colder months when consumers were not using the adhesive within its specified temperature range. Particular problems were noted when aerosol dispensers were placed on a concrete floor, the floor acting as a heat sink to cool the dispensers. In response to these problems, self-adhesive prototype liquid crystal temperature indicators were prepared for developmental tests. For these tests, indications of temperature gradients were not included in the prototype indicators to simplify their use.

Further simplifying use was the indication of an OPTIMUM RANGE of temperatures indicated by a plurality of liquid crystals in separate viewing areas that are grouped for easy recognition, as by a printed border.

The efficacy of prototype liquid crystal temperature indicators was tested on commercially available five-kilogram and seventeen kilogram (cylindrical) aerosol dispensers of T-980 adhesive manufactured by TACC (an Illinois Tool Works Division, headquartered in Air Station Industrial Park, Rockland, Mass. 02370). An aerosol dispenser 40 is schematically illustrated in FIG. 2. Dispenser 40 comprises a container 41 for pressurized liquid, container 41 having inner and outer surfaces, 45 and 43 respectively. Container 41 comprises a bottom 42 spaced apart from a top 46 by a side portion 48. A weld 44 marks the midpoint of side 48 of container 41. An aerosol dispenser nozzle 50 is sealingly coupled (e.g., by a tapered threaded connection) to container top 46. A liquid feed tube 47 is sealingly coupled (e.g., by a flare nut or compression fitting connection) to dispenser nozzle 50. Feed tube 47 extends within container 41 from nozzle 50 toward bottom 42 for conducting pressurized liquid (not shown) within container 41 to nozzle 50. A valve 52 controls liquid flow from feed tube 47 to nozzle 50. A liquid crystal temperature indicator 20 is adhered to the lower quarter of outer surface 43 of container 41.

Each dispenser 40 (schematically illustrated in FIG. 2) was filled approximately one-third full by volume with adhesive, and prototype liquid crystal temperature indicators 20 were reversibly bonded to each dispenser by a pressure sensitive adhesive. Four labels were placed on each canister: one on the portion of the dispenser side 48 adjacent the dispenser bottom 42 (i.e., in the lower quarter of dispenser outer surface 43), one positioned about one-half inch below the midpoint 44 of the dispenser side 48, another positioned about one-half inch above the midpoint 44 of the dispenser side 48, and one on the portion of the dispenser side adjacent the dispenser top 46. A bulb thermometer having a range of −34.44 degrees C. to 48.89 degrees C. was also placed in contact with each dispenser 40.

Dispensers were equilibrated for twenty-four hours at 22.22 degrees C. and then checked to ensure that all liquid crystal temperature indicators displayed similar colors and were in agreement with the bulb thermometer. The bulb thermometer reading was in turn verified with an infrared pyrometer. The dispensers were then chilled in a 0 degree C. freezer for twenty-four hours, followed by placement in a 22.22 degree C. ambient environment. It was observed that the empty portion of the dispensers (i.e., the top two-thirds) warmed at a rate greater than that of the liquid-filled portion (i.e., the bottom one-third). Following equilibration for twenty-four hours at 22.22 degrees C., dispenser temperatures again stabilized at 22.22 degrees C., after which the dispensers were warmed in a 37.78 degree C. oven for twenty-four hours, followed by cooling to a 22.22 degree C. ambient environment. It was observed during cooling that the temperature of the empty portion of the dispensers (i.e., the top two-thirds) cooled at a rate greater than that of the liquid-filled portion (i.e., the bottom one-third).

During the above tests, the prototype self-adhesive labels were observed to produce consistently accurate and reproducible temperature indications. The tests also revealed the importance of applying the labels to a dispenser outer surface at or below the lowest expected level of the pressurized liquid inside the dispenser (i.e., usually in the lower quarter of a dispenser's outer surface).

Additional advantages and modifications of the present invention will readily occur to those skilled in the art. The invention is thus not limited to the specific details, representative methods and apparatus described herein for preferred embodiments.

What is claimed is:

1. A method of making an aerosol, the method comprising:
   providing a container having inner and outer surfaces;
   adding liquid to said container;
   pressurizing said liquid in said container;
   measuring temperature on a portion of said container outer surface with a liquid crystal indicator adhered to said portion of said outer surface, said portion of said container outer surface being opposite a corresponding portion of said container inner surface, and said corresponding portion of said inner surface contacting said pressurized liquid, said liquid crystal indicator being positioned at or below a lowest expected level of said liquid in said container;

comparing said measured temperature to a predetermined standard;

controlling heat flow to said container for adjusting said measured temperature to within a preferred temperature range; and releasing said pressurized liquid from said container as an aerosol when said measured temperature is within said preferred range.

2. The method of claim 1, wherein said measured temperature is a function of color visible on said liquid crystal indicator.

3. The method of claim 2, wherein said predetermined standard is a printed color chart.

4. The method of claim 3 wherein said printed color chart comprises the color green.

5. The method of claim 1, wherein said liquid crystal indicator comprises a plurality of liquid crystals.

6. The method of claim 5 wherein one of said plurality of liquid crystals has a rated temperature of 23.89 degrees Celsius.

7. The method of claim 2 wherein said predetermined standard comprises printed color-identification instructions.

8. An aerosol dispenser, comprising:

a container for pressurized liquid;

an aerosol dispenser nozzle sealingly coupled to said container;

a liquid feed tube sealingly coupled to said nozzle for conducting said pressurized liquid to said nozzle;

a valve for controlling liquid flow from said feed tube to said nozzle; and a liquid crystal temperature indicator adhered to said container for estimating temperature of said pressurized liquid, said liquid crystal temperature indicator being positioned at or below a lowest expected level of said liquid in said container.

9. An aerosol dispenser, comprising a container for pressurized liquid, said container comprising a bottom spaced apart from a top by a side portion;

an aerosol dispenser nozzle sealingly coupled to said container top;

a liquid feed tube sealingly coupled to said nozzle for conducting said pressurized liquid to said nozzle, said feed tube extending within said container from said nozzle toward said bottom;

a valve for controlling liquid flow from said feed tube to said nozzle; and a liquid crystal temperature indicator adhered to said container side portion adjacent to said container bottom.

10. The dispenser of claim 9, wherein said liquid crystal temperature indicator comprises a plurality of liquid crystals, each said liquid crystal having a rated temperature within a preferred temperature range for dispensing an aerosol.

11. The dispenser of claim 10, wherein each of said liquid crystal of said plurality of liquid crystals is black at temperatures outside of a range of about 7.22 degrees Celsius to about 40.56 degrees Celsius.

12. The dispenser of claim 10, wherein said plurality of liquid crystal temperature indicators comprises five liquid crystals having rated temperatures of 12.78, 18.33, 23.89, 29.44 and 35 degrees Celsius respectively.

13. The dispenser of claim 12, wherein each liquid crystal of said plurality of liquid crystals is green at said rated temperature.

14. The dispenser of claim 12, wherein each liquid crystal of said plurality of liquid crystals is blue at a temperature 5.56 degrees Celsius below said rated temperature.

15. The dispenser of claim 12, wherein each liquid crystal of said plurality of liquid crystals is brown at a temperature 5.56 degrees Celsius above said rated temperature.

16. The dispenser of claim 12 wherein said plurality of liquid crystals is arranged in a linear array.

17. A method for dispensing an aerosol from the dispenser of claim 9, the method comprising:

pressurizing a liquid in said container;

estimating a temperature of said liquid using said temperature indicator;

comparing said estimated temperature to a preferred temperature range;

controlling heat flow to said container for adjusting said measured temperature to within said preferred temperature range; and opening said valve to dispense an aerosol from said nozzle when said measured temperature is within said preferred range.

18. A method for dispensing an aerosol from the dispenser of claim 9, the method comprising:

pressurizing a liquid in said container;

estimating a temperature of said liquid using said temperature indicator;

comparing said estimated temperature to a preferred range;

controlling heat flow to said container for adjusting said measured temperature to within said preferred temperature range;

opening said valve to dispense a portion of said pressurized liquid as an aerosol from said nozzle when said measured temperature is within said preferred range;

controlling heat flow to said container for adjusting said measured temperature to within said preferred temperature range; and reopening said valve to dispense a portion of said pressurized liquid as an aerosol from said nozzle when said measured temperature is within said preferred range.

19. The method of claim 18 wherein said pressurized liquid comprises an adhesive.

20. An aerosol dispenser, comprising:

a container for pressurized liquid;

liquid crystal means for estimating temperature of said pressurized liquid, said liquid crystal means being positioned at or below a lowest expected level of said liquid in said container;

means for comparing said estimated temperature with a temperature standard;

temperature adjusting means for adjusting said estimated temperature to said temperature standard; and means for releasing said pressurized liquid as an aerosol.

* * * * *